United States Patent [19]
Warnes et al.

[11] Patent Number: 6,136,451
[45] Date of Patent: Oct. 24, 2000

[54] PLATINUM MODIFIED ALUMINIDE DIFFUSION COATING AND METHOD

[75] Inventors: Bruce M. Warnes, Muskegon; Thomas A. Legard, Whitehall; Nick S. DuShane, Muskegon; Jack E. Cockerill, Montague; Robert W. Beck, North Muskegon, all of Mich.

[73] Assignee: Howmet Research Corporation, Whitehall, Mich.

[21] Appl. No.: 09/018,147

[22] Filed: Feb. 3, 1998

Related U.S. Application Data

[62] Division of application No. 08/685,379, Jul. 23, 1996, Pat. No. 5,788,823.

[51] Int. Cl.$^7$ .......................... B32B 15/00; B22D 25/00
[52] U.S. Cl. ..................... 428/610; 428/639; 428/652; 428/670; 428/941
[58] Field of Search ................... 428/610, 615, 428/639, 652, 668, 670, 680, 941

[56] References Cited

U.S. PATENT DOCUMENTS

| | | | |
|---|---|---|---|
| 3,677,789 | 7/1972 | Bungardt | 117/22 |
| 3,819,338 | 6/1974 | Bungardt et al. | 29/194 |
| 4,501,776 | 2/1985 | Shankar | 427/253 |
| 5,102,509 | 4/1992 | Albon et al. | 205/257 |
| 5,292,594 | 3/1994 | Liburdi et al. | 428/650 |
| 5,482,578 | 1/1996 | Rose et al. | 427/252 |
| 5,549,738 | 8/1996 | Kitada et al. | 205/264 |
| 5,658,614 | 8/1997 | Basta et al. | |
| 5,688,607 | 11/1997 | Rose et al. | 428/639 |
| 5,716,720 | 2/1998 | Murphy | 428/623 |
| 5,763,107 | 6/1998 | Rickerby et al. | 428/623 |
| 5,788,823 | 8/1998 | Warnes et al. | 205/192 |
| 5,914,439 | 6/1999 | McGarry | 65/493 |
| 5,989,733 | 11/1999 | Warnes et al. | 428/652 |

OTHER PUBLICATIONS

Evaluation of Simple Aluminide and Platinum Modified Aluminide Coatings on High Pressure Turbine Blades after Factory Engine Testing—Round II Proc. Int. Gas Turbine Aero Engine Congress. Jun. 1–4m 1992. Conner et al, Jun. 1992.

Platinum Plating From Alkaline Solutions; J. Electrodepositor's Tech. Soc. Vol. 13, 1937, Davies, et al.

Electrodeposition Of Platinum From Chloroplatinic Acid; Trans. Inst. Met. Finish, vol. 36, 1958–1959, p. 7, Atkinson.

Electrodeposition Of Palladium And Platinum Plating, vol. 56 (1969), p. 516, Cramer, et al.

Platinum Plating For Decorative And Functional Applications; Metal Finishing vol. 86 (1988), p. 25–27, Pushparanam, et al.

Evaluation Of Simple Aluminides And Platinum Modified Aluminide Coatings On High Pressure Turbine Blades After Factory Testing; Proc. ASME Int. Cont. of Gas Turbine and Turbines and Aero Engine Congress, Jun. 3–6, 1991, Conner, et al.

Bright Platinum Plating; Plat. Met. Rev. vol. 4 (1960), p. 56, Hopkin, et al.

Handbuch Der Galvanotechnik, Band II, Carl Hanser Verlag, Muenchen 1966, p. 432, 436, Dettner, et al.

*Primary Examiner*—Timothy M. Speer
*Assistant Examiner*—Bryant Young
*Attorney, Agent, or Firm*—Edward J. Timmer

[57] ABSTRACT

A method of improving oxidation resistance of a platinum modified aluminide diffusion coating on a substrate involves electroplating the substrate with a platinum layer from an aqueous hydroxide based electroplating solution and aluminizing the substrate to grow the platinum modified aluminide diffusion coating on said layer. The electroplating solution preferably includes an alkali element and/or alkaline earth element that is incorporated in the platinum layer and in the aluminide diffusion coating formed thereon to significantly improve oxidation resistance of the coating.

14 Claims, 7 Drawing Sheets

PLATINUM MODIFIED ALUMINIDE DIFFUSION COATING AND METHOD

This is now a division of Ser. No. 08/685,379, filed Jul. 23, 1996 now U.S. Pat. No. 5,788,823.

FIELD OF THE INVENTION

The present invention relates to platinum modified aluminide diffusion coatings and methods for making such coatings using a platinum plating techniques that improve coating high temperature oxidation resistance.

BACKGROUND OF THE INVENTION

In modern gas turbine engines, the high pressure turbine section hardware, such as turbine blades and vanes, is exposed to temperatures in excess of 1000 degrees C. for extended periods of time. At such temperatures, high temperature oxidation is the most important form of environmental attack observed with aluminide diffusion coatings. High temperature oxidation is a chemical reaction whose rate controlling process for an aluminide coating is diffusion through a product (oxide) layer. Diffusion is a thermally activated process, and consequently, the diffusion coefficients are exponential functions of temperature. Since the oxidation of aluminide coatings is a diffusion controlled reaction and diffusion coefficients are exponential functions of temperature, the oxidation rate is also an exponential function of temperature. At low temperatures where diffusion coefficients are relatively small, the growth rate of a protective scale on any aluminide coating is also small. Thus, adequate oxidation resistance should be provided by any state of the art aluminide coatings, such as: chromium aluminide, aluminide or two phase [PtAl$_2$+(Ni,Pt)Al] platinum aluminide, all inward grown coatings made by pack cementation. However, at high temperatures where the diffusion coefficients and consequently the oxidation rate increase rapidly with increasing temperature, only coatings which form high purity alumina (Al$_2$O$_3$) scales are likely to provide adequate resistance to environmental degradation.

The presence of platinum in nickel aluminide has been concluded to provide a number of thermodynamic and kinetic effects which promote the formation of a slow growing, high purity protective alumina scale. Consequently, the high temperature oxidation resistance of platinum modified aluminide diffusion coatings generally is better as compared to aluminide diffusion coatings not containing platinum.

In recent years, several limitations of the industry standard, two phase [PtAl$_2$+(Ni,Pt)Al], inward grown platinum aluminide coatings have been identified. First, the two phase coatings have metastable phase assemblages and thicknesses, as demonstrated in engine tests at both General Electric and Rolls-Royce. Second, the two phase coatings are sensitive to thermal mechanical fatigue (TMF) cracking in engine service, and the growth of these coatings in service only makes this problem worse. Third, the thick, inward grown platinum aluminides exhibit rumpling during both cyclic oxidation and engine testing. This phenomenon can have particularly undesirable consequences when platinum aluminide coatings are used as the bond coat in thermal barrier coating systems. Fourth, the two phase platinum aluminide coatings are hard and brittle, and this can result in chipping problems during post coat handling and assembly operations.

Many of the problems encountered with the previous industry standard platinum aluminides can be attributed to the two phase, inward grown structure and can be overcome by using outwardly grown, single phase platinum aluminde coatings as described, for example, in the Conner et al. technical articles entitled "Evaluation of Simple Aluminide and Platinum Modified Aluminide Coatings on High Pressure Turbine Blades after Factory Engine testing", Proc. AMSE Int. Conf. of Gas Turbines and Aero Engine Congress Jun. 3–6, 1991 and Jun. 1–4, 1992. For example, the outwardly grown, single phase coating microstructure on directionally solidified (DS) Hf-bearing nickel base superalloy substrates was relatively unchanged after factory engine service in contrast to the microstructure of the previous industry standard two phase coatings. Further, the growth of a CVD single phase platinum aluminide coating was relatively insignificant compared to two phase coatings during factory engine service. Moreover, the "high temperature low activity" outward grown platinum aluminde coatings were observed to be more ductile than inward grown "low temperature high activity" platinum aluminide coatings.

In the production of platinum modified aluminide diffusion coated gas turbine engine components, such as blades and vanes, the components are conventionally electroplated to deposit platinum metal on their gas path surfaces prior to aluminizing. Some plating baths used in the past employ hexachloro platinic acid ((H$_2$PtCl$_6$) as a source of platinum with examples including the phosphate buffer solution as described in U.S. Pat. Nos. 3,677,789 and 3, 819,338 or an acid chloride bath similar to that outlined by Atkinson in Trans. Inst. Metal Finish. vol. 36 (1958 and 1959) page 7. Sulfate solutions also have been used in the past which utilize a P salt [(NH$_3$)$_2$Pt(NO$_2$)$_2$] precursor as described by Cramer et al. in Plating vol. 56 (1969) page 516 or H$_2$Pt(NO$_2$)$_2$SO$_4$ precursor as described by Hopkins et al. in Plat. Met. Rev. vol. 4 (1960) page 56. Finally, some platinum aluminide coating procedures utilize a platinum Q salt [(NH$_3$)$_4$Pt(HPO$_4$)] bath as discussed by Albon, Davis, Skinner and Warren in U.S. Pat. No. 5,102,509. Conventionally well known platinum plating baths contain high concentrations of sulfur and/or phosphorous and/or chlorine, and the deposition reactions in all these baths involve complex ions with ligands containing sulfur and/or phosphorous and/or chlorine.

SUMMARY OF THE INVENTION

The present invention relates to the discovery that the oxidation resistance of platinum modified aluminide diffusion coatings made by electroplating platinum on the substrate followed by aluminizing can be improved by electroplating platinum using a plating solution that is different in composition from those used heretofore to this end and effective to significantly reduce the presence of such harmful tramp impurites as phosphorus, sulfur and chlorine in the platinum deposit and aluminide diffusion coating subsequently formed thereon. The present invention recognizes for the first time that use of the conventional platinum plating baths including high concentrations of phosphorous and/or sulfur and/or chlorine are detrimental to oxidation resistance of platinum modified aluminide diffusion coatings in that phosphorus and/or sulfur and/or chlorine from the platinum plating bath can be incorporated in the platinum deposit and then the aluminide diffusion coating subsequently formed thereon where the impurities adversely affect oxidation resistance.

The present invention provides a method of improving the oxidation resistance of platinum modified aluminide diffusion coatings by electroplating platinum onto a substrate using an aqueous caustic platinum plating solution based on alkali and alkaline earth hydroxide to reduce tramp impurities in the platinum plating and then aluminizing by CVD or other techniques the substrate to form a platinum modified aluminide diffusion coating having, in turn, significantly reduced concentrations of the tramp impurites and improved oxidation resistance.

In one embodiment of the present invention, the platinum plated substrate is aluminized without prediffusion of the platinum deposit into the susbtrate and under CVD conditions effective to reduce such tramp impurities as the aluminide diffusion coating is formed.

The present invention also relates to the discovery that the oxidation resistance of platinum modified aluminide diffusion coatings made by electroplating platinum on the substrate followed by aluminizing can be significantly and unexpectedly improved by electroplating platinum using an aqueous caustic solution having a concentration of at least one of alkali hydroxide and alkaline earth hydroxide effective to introduce or dope the platinum deposit with at least one of alkali element and alkaline earth element for incorporation in the platinum modified aluminide diffusion coating formed thereon in amounts effective to significantly and unexpectedly increase oxidation resistance of the coating.

In one embodiment of the present invention, the platinum plating solution is provided with a relatively high concentration of an alkali element and/or alkaline earth element effective to dope the platinum deposit with alkali element or alkaline earth element. The platinum plated substrate then is aluminized without prediffusion of the platinum deposit into the substrate and under CVD conditions effective to remove such tramp impurties as phosphorus and sulfur while retaining the alkali elment or alkaline earth element in the aluminide diffusion coating as it is formed.

The present invention provides a platinum modified aluminide diffusion coating characterized by reduced concentrations of tramp impurities as such phosphorous and sulfur and improved coating oxidation resistance.

The present invention also provides a platinum modified aluminide diffusion coating characterized by the presence of one or more of an alkali element, such as K and/or Na, and alkaline earth element, such as Ca and/or Mg, in effective concentration to significantly and unexpectedly improve coating oxidation resistance.

Details and advantages of the present invention will become more readily apparent from the following detailed description taken with the following drawings.

DETAILED DESCRIPTION OF THE INVENTION

Figure 1:
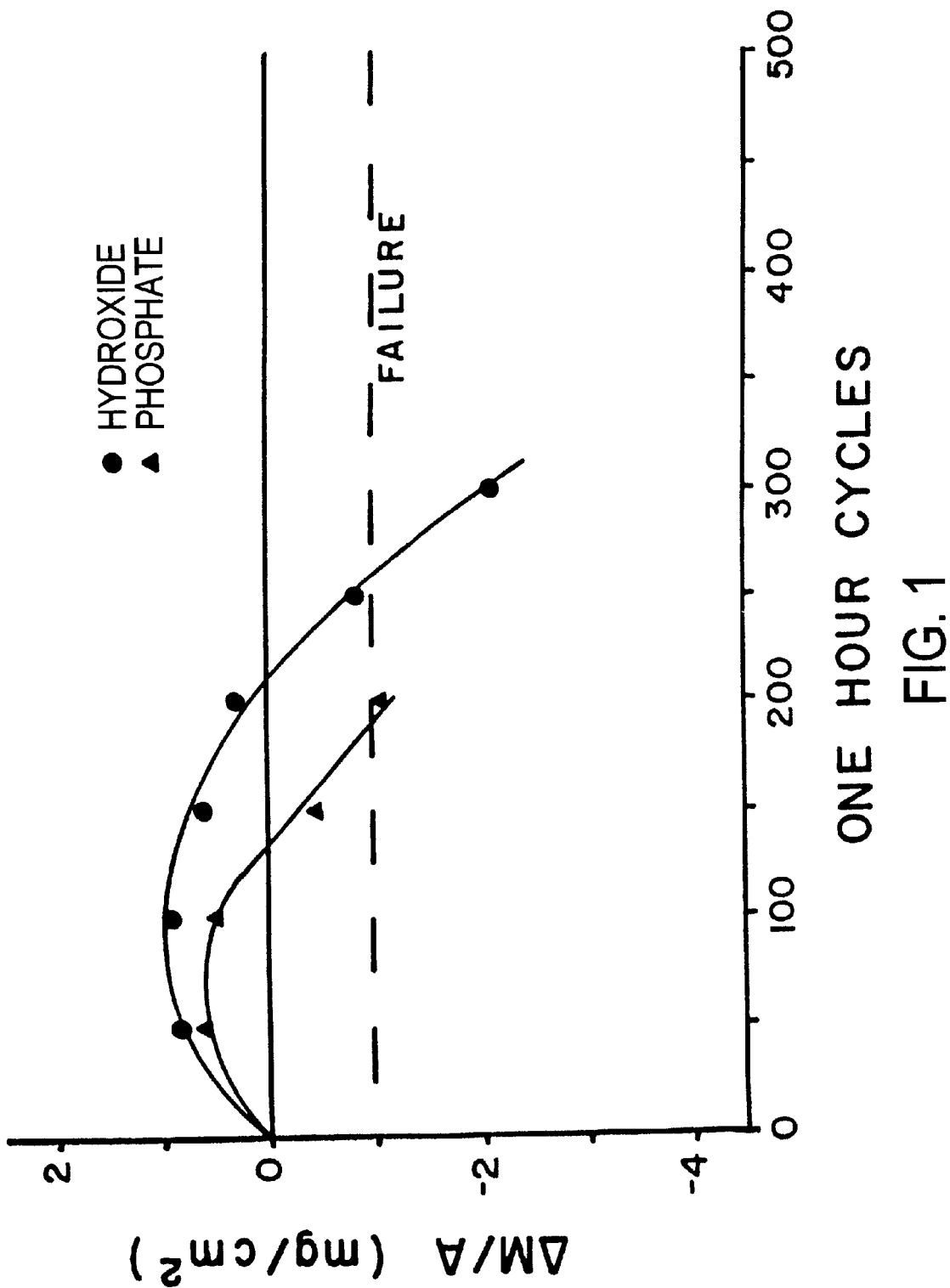
FIG. 1 is a graph depicting comparative cyclic oxidation resistance at 2150 degrees F. of inwardly grown two phase platinum aluminide coatings designated LDC-2E formed on MARM-247 nickel base superalloy substrates, one coating (see solid circle data points) being formed in accordance with an embodiment of the present invention using an aqueous caustic based platinum plating solution and the other coating (see solid triangle data points) using a conventional known phosphate buffer platinum plating solution.

An embodiment of the present invention involves the discovery that the oxidation resistance of platinum modified aluminide diffusion coatings made by electroplating platinum on the substrate followed by an aluminizing step can be improved by electroplating platinum on the substrate using an aqueous caustic plating solution to reduce the presence of such harmful tramp impurites as phosphorus, sulfur and chlorine in the platinum depsoit and in the aluminide diffusion coating subsequently formed on the substrate.

For example, in platinum plating trials, substrates in the form of foils having a thickness of 6–8 mil (0.006–0.008 inch) and comprising conventional IN 738 nickel base superalloy were platinum plated using the conventional phosphate $HPO_4/H_2PO_4$ buffer plating solution to deposit about 9–11 milligrams per centimeter squared as a platinum deposit or layer on the susbtrates. The plating solution comprised 13 grams/liter $H_2PtCl_6$, 45 grams/liter $(NH_4)_3PO_4$ (triammonium phosphate) and 240 grams/liter $Na_2HPO_4$ (disodium hydrogen phopshate) pursuant to U.S. Pat. Nos. 3,677,789 and 3,819,338.

The IN 738 substrate foils included an initial (before plating) measured phosphorus content of 0.0053 weight % and S content of 0.0010 weight %. However, after plating with 9–11 milligrams per centimeters squared of platinum using the conventional plating technique described, the platinum electrodeposit was found to contain a bulk P content of 0.0451 weight % P and a bulk S content of 0.0006 weight % S. It is apparent that the bulk concentration of phosphorous in the platinum plate was a factor of ten times greater than the substrate.

Certain of the platinum plated foils as well as platinum plated 1/8 inch thick tabs were aluminzed to form different types of platinum modified aluminide diffusion coatings. For example, an inwardly grown two phase platinum modified aluminide diffusion coating designated LDC-2E was formed by first diffusing the platinum layer into the substrates by heat treatment at 1052 degrees C. for 1 hour. Then, the heat treated substrate foils were aluminized by pack cementation at a substrate temperature of 1875 degrees F. (1024 degrees C.) using a pack composition comprising 33% by weight Al alloy and balance alumina. After aluminizing in this manner, the coated foils were chemcially analyzed using a Leco CS444LS analyzer for carbon and sulfur and Perkin and Elmer 5000 Atomic Absorption Spectrometer for P, B, and major metals such as W. The pack aluminized substrates were found to contain 0.044 weight % P and 7 parts per million (ppm) S. Thus, the increased P bulk concentration of the platinum eloectrodeposit remained after the pack cementation aluminizing operation and was incorporated in the aluminide diffusion coating.

Similarly, other samples of the platinum plated foils as well as platinum plated 1/8 inch thick tabs were aluminized to form an inwardly grown two phase platinum modified aluminide diffusion coating designated MDC-150 by first diffusing the platinum layer into the substrates by heat treatment at 987 degrees C. for 2 hours. Then, the heat treated substrates were aluminized by chemical vapor deposition at a substrate temperature of 1850 degrees F. (1010 degrees C.) using coating gas mixture comprising 9 volume % aluminum trichloride and subchloride plus 91 volume % hydrogen at a flow rate of 300 scfh and total pressure of 500 Torr. The coating mixture was generated by passing high purity hydrogen and hydrogen chloride in mixture of hydrogen/13 volume % HCl over a 99.999% pure source of aluminum at 290 degrees C. and then passing that gas mixture through a high temperature generator having a Cr-Al alloy source at 1010 degrees C. to form a mixture of aluminum trichloride and aluminum subchlorides. The CVD aluminized substrates were found to contain 0.039 weight % P and 8 ppm S.

Similarly, other samples of the platinum plated foils as well as platinum plated 1/8 inch thick tabs were aluminized to form an outwardly grown single phase platinum modified aluminide diffusion coating designated MDC-150L by aluminizing the as-plated substrates by chemical vapor deposition at a substrate temperature of 1080 degrees C. using coating gas mixture comprising 9 volume % aluminum trichloride and 91 volume % hydrogen at a flow rate of 300 scfh and total pressure of 500 Torr. The coating mixture was generated by passing high purity hydrogen (e.g. less than 30 parts per billion impurities) and high purity hydrogen chloride (e.g. less than 25 parts per million impurities) in mixture of hydrogen/13 volume % HCl over a 99.999% pure source of aluminum at 290 degrees C. No prediffusion heat treatment of the platinum layer was used. Hydrogen chloride which produces a purification of the substrate and coating (i.e. reductions in concentrations of tramp elements and refractory elements) in this particular CVD coating process was produced by hydrogen reduction of aluminium trichloride on the sample surface. The CVD aluminized substrates were found to contain 0.014 weight % P and 5 ppm S. Thus, the increased P bulk concentration of the platinum electrodeposit was reduced about 79 by this particular CVD coating process, although 0.014 weight % P still remained in the substrate and coating and was above the initial P content (0.005 weight % P) of the IN 738 foil.

Use of the conventional phosphate platinum plating bath including high P concentrations thus appear to incorporate P in the platinum deposit and ultimately in the aluminide diffusion coating subsequently formed thereon. Use of conventional sulfate based platinum plating baths including high concentrations of sulfur are suspected to similarly incorporate sulfur in the platinum deposit and ultimately in the aluminide diffusion coating subsequently formed thereon where these tramp impurites appear to adversely affect oxidation resistance of the coating.

The present invention provides a method of improving the oxidation resistance of platinum modified aluminide diffusion coatings by electroplating platinum onto a substrate using an aqueous caustic solution based on an alkali hydroxide or alkaline earth hydroxide. Use of the hydroxide plating solution significantly reduces the presence of such harmful tramp impurities as phosphorus and/or sulfur and/or chlorine in the platinum deposit and thus in the platinum modified aluminide diffusion coating formed on the substrate.

For purposes of illustration and not limitation, one embodiment of the invention employs a platinum plating solution comprising an aqueous caustic solution based on one or more of alkali hydroxide and alklaine earth hydroxide. In particular, aqueous solutions of KOH are preferred, although mixtures of KOH and NaOH, $Ca(OH)_2$, $Mg(OH)_2$ and others may be used. The plating solutions are made using pure salts (e.g. KOH) having less than 5 parts per million sulfur and phosphorus and deionized water.

Several platinum hydroxide precursors are commercially avaliable for practicing the invention, although hexahydroxy platinic acid $H_2Pt(OH)_6$ is preferred having sulfur and phosphorous less than 5 parts per million and Cl less than 10 parts per million. A suitable hexahydroxy platinic acid for practicing the invention is available as crystals from Johnson-Matthey Inc. or Engelhardt Industries Inc. Other platinum hydroxide precursors that can be used include $(NH_4)_2Pt(OH)_6$, $K_2Pt(OH)_6$ and the like.

The platinum hydroxide plating solution can be operated over ranges of concentrations and plating parameters.

Preferred ranges for platinum plating prior to aluminizing to form platinum modified aluminide diffusion coatings pursuant to the invention are set forth in Table 1:

TABLE 1

| K(OH) Pt PLATING BATH | | |
|---|---|---|
| PLATING PARAMETER | RANGE | PREFERRED RANGE |
| [K(OH)] | >8 gr K(OH)/Liter | >9 gr K(OH)/Liter |
| [Pt] | >9 gr Pt/Liter | 10–11 gr Pt/Liter |
| Temperature | 60 to 90° C. | 70° C. |
| pH | 10 < pH < 13 | 11.2 < pH < 11.9 |
| Current Density | <0.075 A/cm$^2$ | <0.02 A/cm$^2$ |

(gr = grams)

In Table 1, the Pt concentration is set forth on the basis of the Pt content only. The amount of $H_2Pt(OH)_6$ required to be present in the plating solution to achieve the specified Pt content can be readily calculated.

The parameters set forth in Table 1 yield a smooth, fully dense platinum deposit of generally uniform thickness (e.g. 0.25 to 0.35 mil plus or minus 0.05 mil) over the entire gas path surface (e.g. airfoil and platform surfaces) of such gas turbine engine hardware as turbine blades and vanes comprising conventional and well known nickel base or cobalt superalloys, some of which are identified above. The platinum concentration in the plating solution is maintained by peroidic additions of the aforementioned $H_2Pt(OH)_6$, while the pH is adjusted by periodic additions of KOH or other caustic. The useful life of the plating solution can be determined by chemical analysis of the platinum deposit and/or platinum modified aluminide diffusion coating combined with cyclic oxidation testing of the aluminide coating. However, as will be described below, the aforementioned platinum hydroxide plating solution can produce unexpectedly significant enhancements in oxidation resistance of the aluminide diffusion coating susbequently formed as the plating solution ages and the concentrations of such elements as K, Na, Ca, and/or Mg increase therein by addition of caustic and hydroxo platinic acid. Thus, the useful life of the platinum plating solution of the invention can be extremely long based on available data.

In the platinum electroplating of such gas turbine hardware as turbine blades and vanes, the hardware is made the cathode, and an anode comprising platinized nickel is used to complete the electrical circuit. The anode can comprise perforated plates without the need for complex auxiliary anodes sometimes used in plating solutions involving amine ligand complexes.

The chemical composition of platinum electrodeposited from a phosphate based solution of the type described above and from the potassium hydroxide based solution in accordance with the invention was compared in a series of experiments. In particular, substrate foils having a thickness of 6 to 8 mils and comprising conventional PWA-1480 nickel base superalloy were electroplated using the phosphate based solution of the type described above at a current density of 0.09 Ampere/$cm^2$ to deposit 9–11 milligrams Pt/$cm^2$ on the substrate foils. Similar substrate foils were electroplated using the potassium hydroxide based solution of the type described above (9 grams of KOH per liter and 10 grams of Pt per liter) at a current density of 0.015 Ampere/$cm^2$ to deposit 9–11 milligrams Pt/$cm^2$ on the substrate foils. Some of the platinum plated foils then were chemically analysed while others were aluminized using different aluminizing processes described above to produce aluminide diffusion coatings designated LDC-2E, MDC-150, and MDC-150L that were subsequently chemically analyzed. Table 2 provides a summary of the mass spectrometer chemical analysis (weight percent) results of the platinum plated foils as well as aluminized foils.

TABLE 2

CHEMICAL ANALYSIS OF PWA-1480 FOILS

| ELEMENT | BATH | PLATED | LDC-2E | MDC-150 | MDC-150L |
|---|---|---|---|---|---|
| S | hydroxide | 0.006% | 0.014% | 0.0006% | 0.0001% |
|   | phosphate | 0.006% | — | 0.0015% | 0.0003% |
| P | hydroxide | <0.01% | <0.01% | <0.01% | <0.01% |
|   | phosphate | 0.03% | 0.02% | 0.04% | <0.01% |
| Cl | hydroxide | 0.001% | <0.001% | 0.004% | 0.001% |
|   | phosphate | 0.002% | 0.002% | 0.008% | 0.001% |

A review of Table 2 indicates that the concentration of such impurities as S, P, and Cl generally is lower in the samples as-plated (column designated "PLATED") using the hydroxide based plating solution of the invention (designated "hydroxide" in the Table). Similarly, the concentration of such impurities generally is lower in the samples as-aluminized (columns designated "LCD-2E", "MDC-150", and "MDC-150L") that used the hydroxide based plating solution of the invention followed by the aluminzing treatment indicated.

Oxidation resistance was evaluated using MARM-247 nickel base superalloy specimens having dimensions of 1 inch by ½ inch by ⅛ inch and rounded edges and corners suitable for oxidation testing. The oxidation test samples were divided into two groups with one group platinum plated using the phosphate buffer based solution of the type described above at a current density of 0.09 Ampere/$cm^2$ to deposit 9–11 milligrams Pt/$cm^2$ on the substrate samples and another group platinum plated using the potassium hydroxide based plating solution of the type described above (9 grams of KOH per liter and 10 grams of Pt per liter) at a current density of 0.015 Ampere/$cm^2$ to deposit 9–11 milligrams Pt/$cm^2$ on the substrate samples. Then, the samples in each of these groups were divided into three groups for aluminizing with one group aluminized to form the inwardly grown high Al activity pack cementation LDC-2E coating, one group aluminized to form the inwardly grown CVD coating (using high temperature aluminum halide generator), and one group aluminized to form the outwardly grown single phase low Al activity MDC-150L coating (using coating purification parameters) described above. CVD coating apparatus of the type described in U.S. Pat. No. 5,261,963 can be used to practice CVD aluminizing. Coating thickness were as shown in Table 3 for LDC-2E, MDC-150, and MDC-150L. Hence, different types of aluminizing techniques and resultant different platinum modified aluminide diffusion coatings were evaluated for oxidation resistance.

The oxidation samples were cyclic oxidation tested at 2150 degrees F. using a one hour cycle that consisted of 50 minutes at temperature and 10 minutes rapid air cooling. Three samples of each platinum plating/aluminizing type were weighed before exposure and after every 50 cycles. After each 50 hour test interval, the weight changes from each set of three samples were averaged, and the average weight changes were plotted as a function of exposure cycles (hours). Failure was defined as a loss of 1 milligram per centimeter squared relative to a sample's initial weight.

Figure 2:
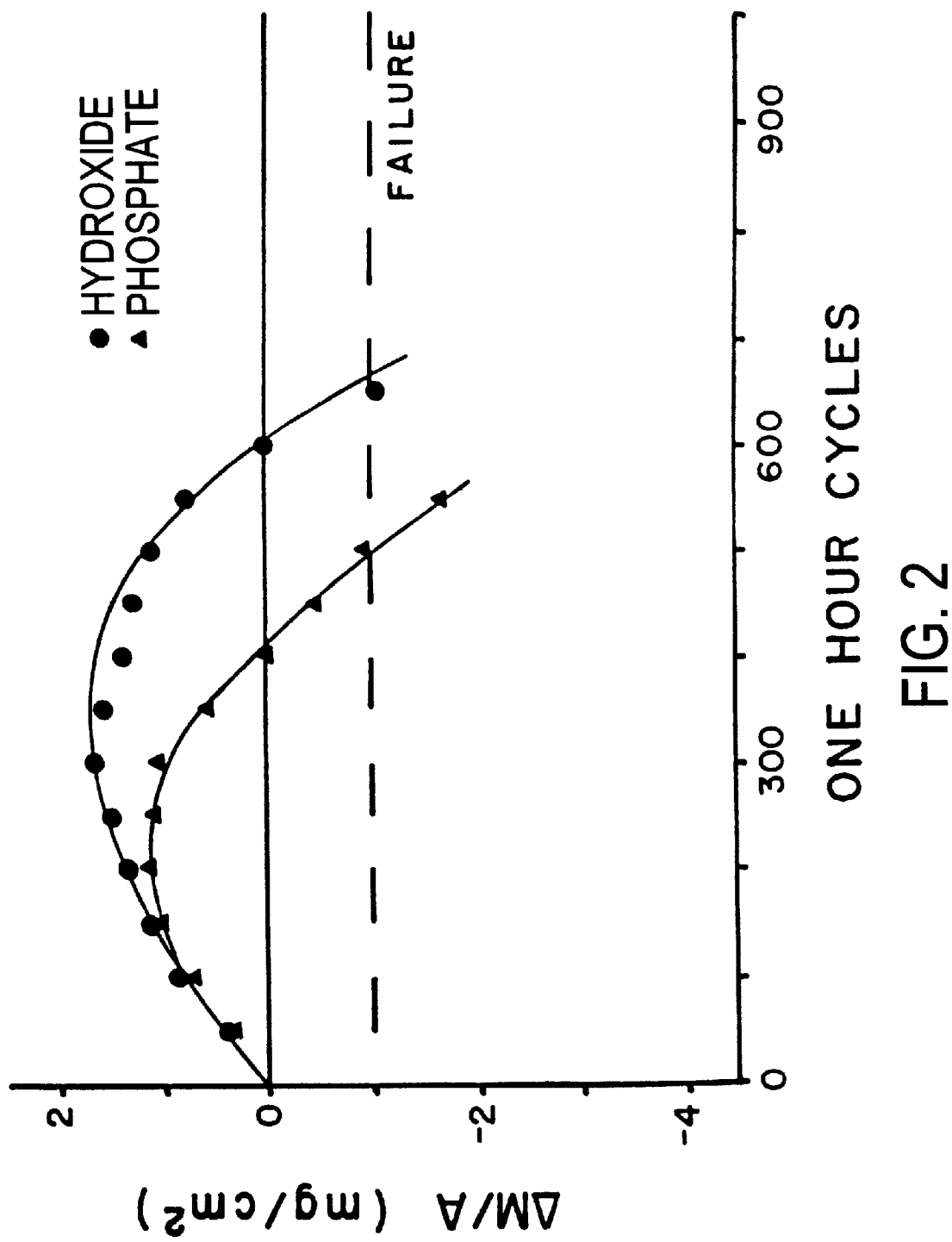
FIG. 2 is a graph depicting comparative cyclic oxidation resistance at 2150 degrees F. of inwardly grown two phase CVD platinum aluminide coatings designated MDC-150 formed on MARM-247 nickel base superalloy substrates, one coating (see solid circle data points) being formed in accordance with an embodiment of the present invention using an aqueous caustic platinum plating solution and the other coating (see solid triangle data points) using a conventional known phosphate buffer platinum plating solution.
Figure 3:
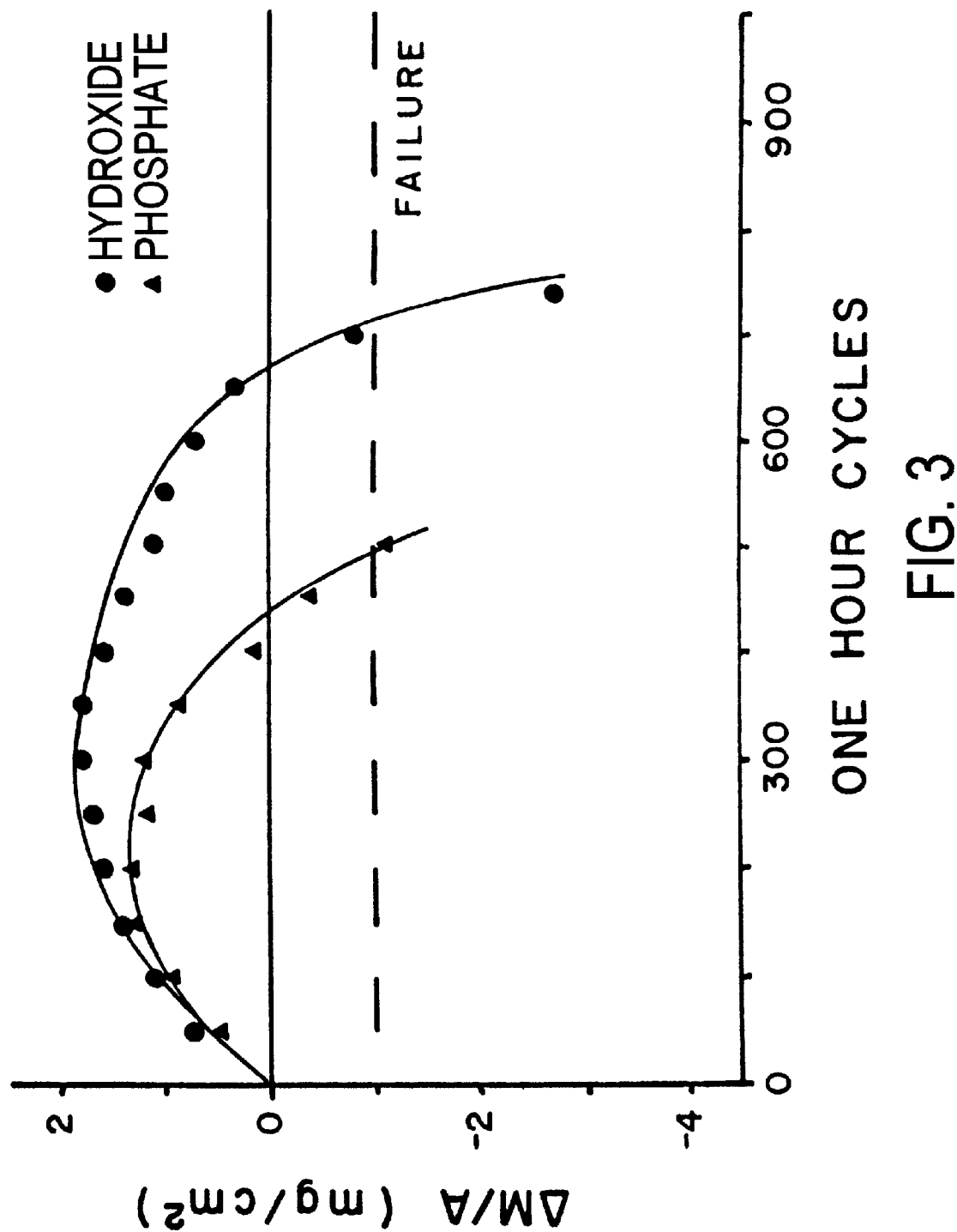
FIG. 3 is a graph depicting comparative cyclic oxidation resistance at 2150 degrees F. of outwardly grown single phase CVD platinum aluminide coatings designated MDC-150L formed on MARM-247 nickel base superalloy substrates, one coating (see solid circle data points) being formed in accordance with an embodiment of the present invention using an aqueous casutic platinum plating solution and the other coating (see solid triangle data points) using a conventional known phosphate buffer platinum plating solution.

FIGS. 1, 2, and 3 set forth the weight change data from the oxidation tests of the samples. A review of these Figures reveals that oxidation resistance of the samples made using the aqueous caustic plating solution of the invention was increased as compared to that of samples made using the conventional phosphate based plating solution. The cyclic oxidation data were normalized for the different coating thicknesses involved so the direct comparison of oxidation resistance could be made. Table 3 provides the relative life of the three aluminide diffusion coating using the two different platinum plating solutions, while Table 4 sets forth the variation in life for the three aluminide diffusion coating types using the two different platinum plating solutions.

TABLE 3

| PLATING BATH | COATING | CYCLES TO FAILURE | THICKNESS MIL | CYCLES MIL | RELATIVE LIFE |
|---|---|---|---|---|---|
| phosphate | LDC-2E | 190 | 3.50 | 54.29 | 1 |
| hydroxide |  | 260 | 3.55 | 73.24 | 1.35 |
| phosphate | MDC-150 | 500 | 3.56 | 140.44 | 1 |
| hydroxide |  | 650 | 3.70 | 175.68 | 1.25 |
| phosphate | MDC-150L | 505 | 3.17 | 159.31 | 1 |
| hydroxide |  | 715 | 3.29 | 217.33 | 1.36 |

TABLE 4

| PLATING BATH | COATING | CYCLES TO FAILURE MIL | RELATIVE LIFE |
|---|---|---|---|
| hydroxide | LDC-2E | 73.24 | 1 |
| | MDC-150 | 175.68 | 2.4 |
| | MDC-150L | 217.33 | 2.97 |
| phosphate | LDC-2E | 54.29 | 1 |
| | MDC-150 | 140.44 | 2.59 |
| | MDC-150L | 159.31 | 2.93 |

The data in Table 3 indicate that the use of the aqueous caustic plating solution of the invention improves the oxidation resistance of the three types of platinum modified aluminide diffusion coatings evaluated by 25% to 36% as compared to the same three types of platinum modified aluminide diffusion coatings made using the phosphate based platinum plating solution. The relative life of the various platinum modified aluminide diffusion coatings is essentially the same for each plating bath type in Table 4 since the difference between the three aluminide coating types is due to the cleanliness of the aluminizing processes used.

The invention provides an outwardly grown single phase platinum modified aluminide diffusion coating designated MDC-150L above characterized by extremely low concentrations of S and P as a result of the combination of use of the aqueous caustic platinum solution described above and CVD aluminizing without a platinum prediffusion heat treatment under CVD conditions effective to reduce the amounts of such tramp impurities in the aluminide diffusion coating as it is outwardly grown on the platinum plated substrate. In particular, the invention provides an outwardly grown single phase platinum modified aluminide diffusion coating designated MDC-150L above characterized by a S concentration in the aluminide diffusion coating additive layer that is less than 50% of the S concentration present in the underlying substrate. Reductions of S concentration in the outwardly grown single phase platinum modified aluminide diffusion coating designated MDC-150L have been 50%, 78%, and 99.6% depending upon the substrate superalloy involved (In738, Ni foil and PWA-1480, respectively for the percentages given). The highest reductions in S concentration in the aluminide diffusion coating have been achieved on PWA-1480 nickel base superalloy substrates. Typically, the S concentration in the outwardly grown single phase platinum modified aluminide diffusion coating designated MDC-150L is measured at less than 10 parts per million by weight and the P concentration is measured at less than 50 parts per million by weight near the outer aluminide coating surface (e.g. proximate the outer surface of the additive layer) for common nickel base superalloys used in the manufacture of gas turbine engine blades and vanes as a result of the combination of use of the aqueous caustic plating solution described above and CVD aluminizing the as-plated substrate under CVD conditions effective to reduce the amounts of such tramp impurities in the aluminide diffusion coating as it is outwardly grown on the plated susbtrate.

The MDC-150L aluminide diffusion coating can include at least one of an alkali element, such as K and/or Na, and alkaline earth element, such as Ca and/or Mg, in effective concentration to significantly and unexpectedly improve coating oxidation resistance as explained below. Alternately or in addition, the MDC-150L aluminide diffusion coating can include silicon and active elements, such as Hf, Zr, Ce, La, Y, etc. in the outer additive layer of the coating in amounts of 0.01 to 8 weight % effective to improve oxidation resistance and provide second phase silicide particles (e.g. hafnium silicide) in the additive layer as described in copending patent application entitled ACTIVE ELEMENT MODIFIED PLATINUM ALUMINIDE DIFFUSION COATINGS AND CVD COATING METHOD of common assignee herewith (attorney docket No. Howmet 372, the teachings of which are incorporated herein by reference.

The present invention also involves the discovery that the oxidation resistance of platinum modified aluminide diffusion coatings made by electroplating platinum on the substrate followed by aluminizing can be significantly and unexpectedly improved by electroplating platinum using an aqueous caustic solution having a concentration of one or more alkali and alkaline earth elements as their hydroxides effective to introduce or dope the platinum plating with an alkali and/or alkaline earth element for incorporation in the platinum modified aluminide diffusion coating formed thereon in amounts effective to significantly and unexpectedly increase oxidation resistance of the coating.

Figure 4:
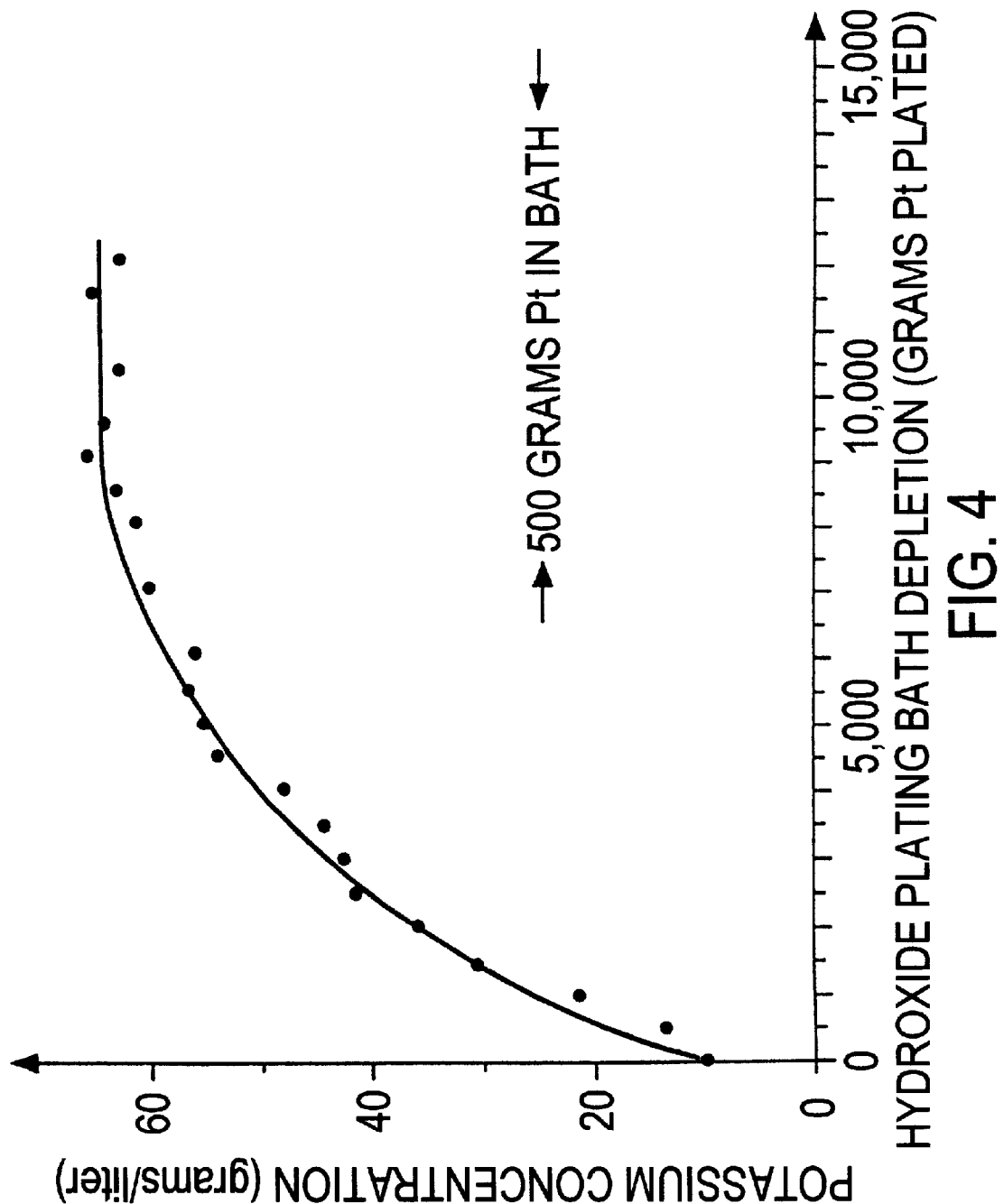
FIG. 4 is a graph showing the increase in concentration of K in aqueous caustic plating solution of the invention as a function of the number of grams of platinum plated onto substrates.
Figure 5:
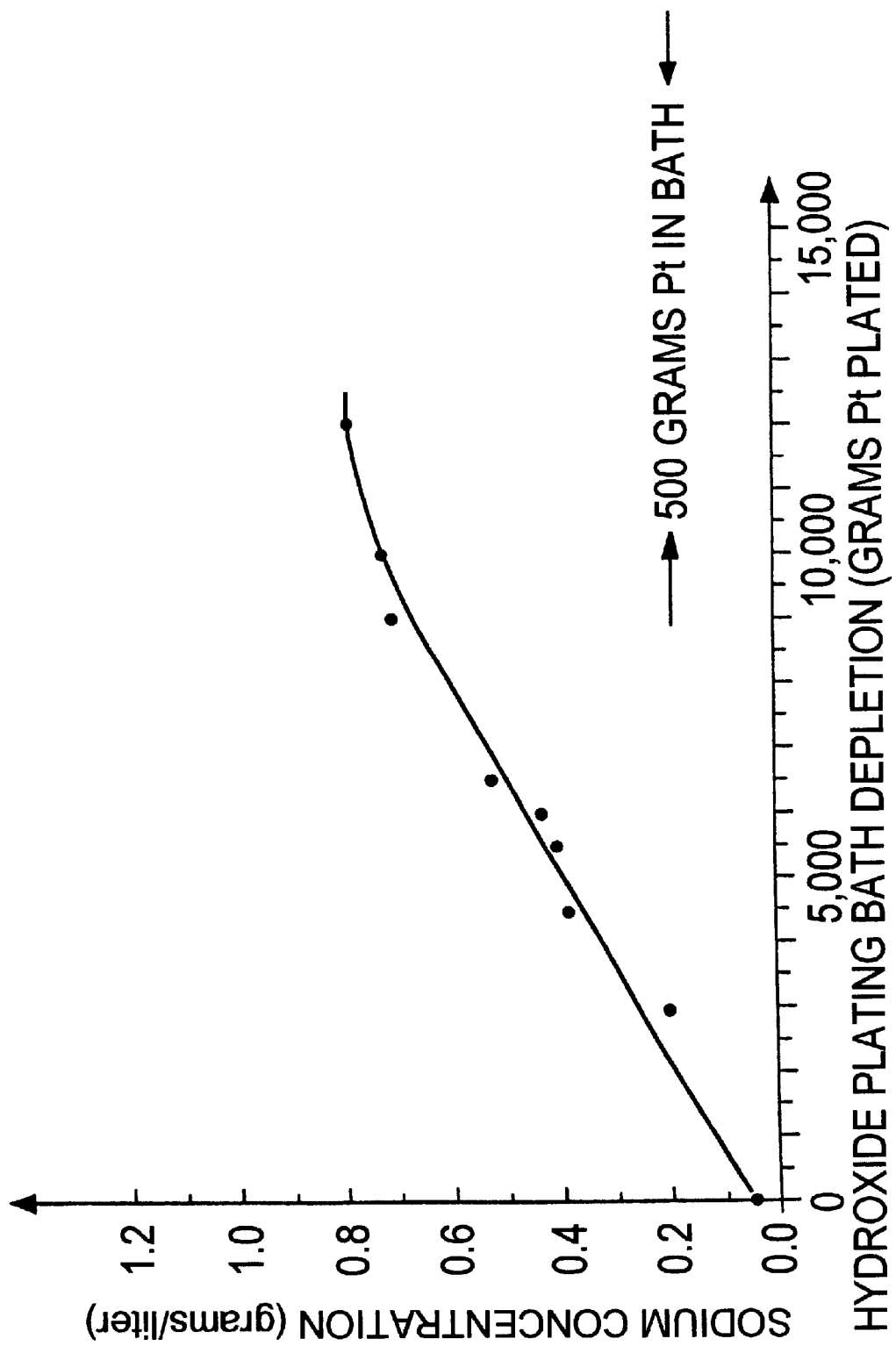
FIG. 5 is a graph showing the increase in concentration of Na in an aqueous caustic plating solution of the invention as a function of the number of grams of platinum plated onto substrates.

For example, referring to FIG. 4, the increase or build-up of the concentration of the alkali element, K, in the hydroxide platinum plating solution described above in accordance with the invention is shown over time as a function of the platinum plated from the solution. The increase of K over time occurs as a result of the addition of KOH to the plating solution for pH adjustment purposes as explained above with respect to the life of the solution. FIG. 5 shows the increase or build-up of the concentration of the alkali element, Na, in a hydroxide platinum plating solution over time as a function of the platinum plated from the plating solution [Na(OH) is an impurity in both $H_2Pt(OH)_6$ and KOH and reacts with carbon dioxide in the ambient air].

Figure 6:
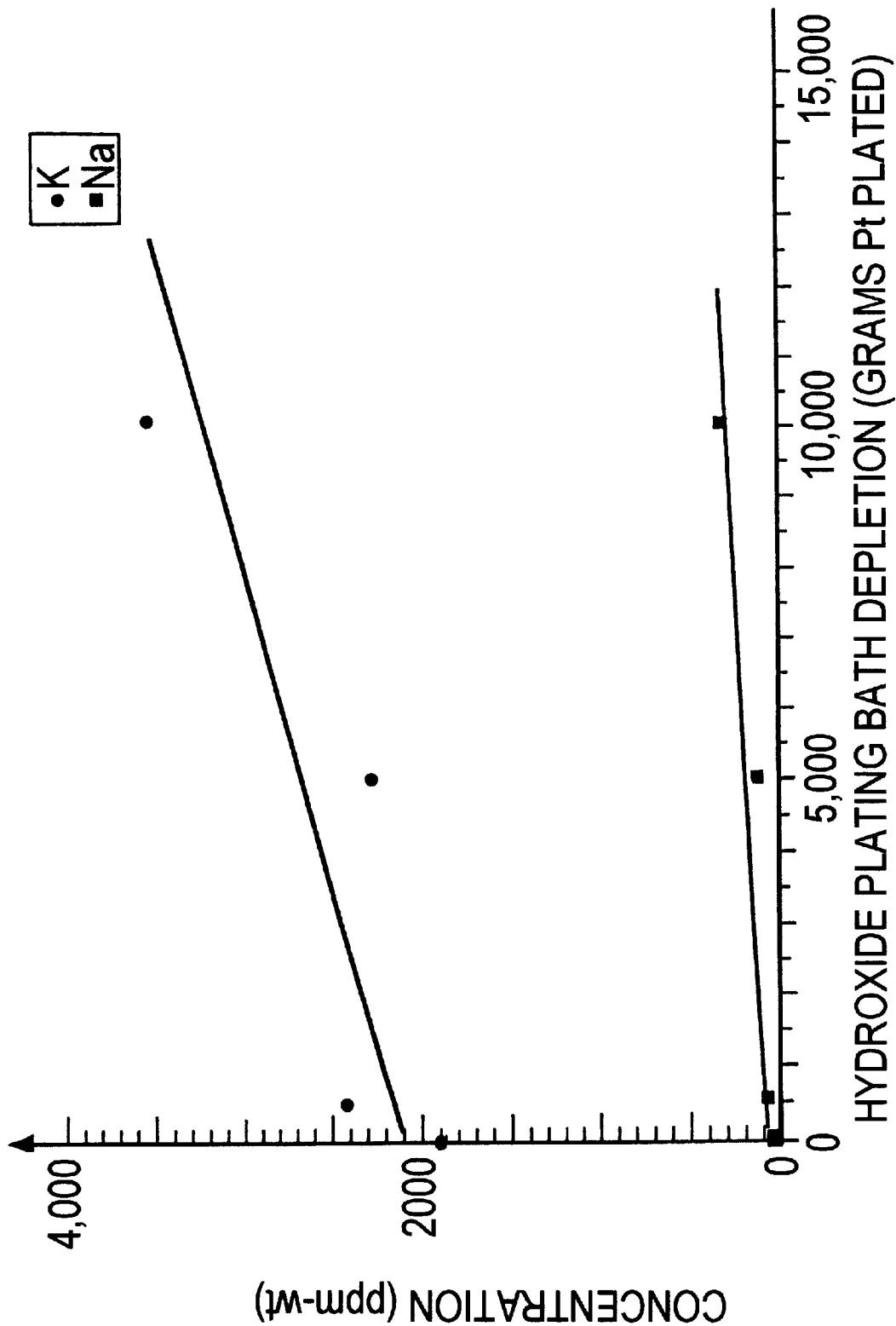
FIG. 6 is a graph showing the increase in concentrations of both K and Na in the Pt electrodeposited from a plating solution of the invention as a function of the number of grams of platinum plated from the solution onto substrates.

FIG. 6 shows the increase of the concentrations of Na and K in the platinum plate produced by the hydroxide bath in accordance with the invention over time as a function of the platinum plated from the solution. The increase in the concentration of K and Na in the platinum electrodeposit over time is caused by the build-up of these elements in the plating bath, as illustrated in FIGS. 4 and 5. The concentration of calcium in the platinum electrodeposit is independent of bath life and averages about 100 ppm by weight for bath depletions from zero to 12,000 grams platinum plated (the depletion range considered in FIGS. 4, 5 and 6).

A series of experiments was conducted to determine the variation of oxidation resistance of the outwardly grown single phase platinum modified aluminide diffusion coating designated MDC-150L as a function of the change in composition of the hydroxide plating solution of the invention. The oxidation samples comprised PWA 1480 nickel base superalloy and were similar to those described above. The samples were electroplated using the KOH based plating solution described above (e.g. see Table 1) after various amounts of platinum had been plated from the solution and then aluminized after plating without a platinum prediffusion heat treatment using the CVD parameters described for the MDC-150L aluminide diffusion coating. A sample electroplated using a conventional phosphate plating bath was included for comparison purposes.

Figure 7:
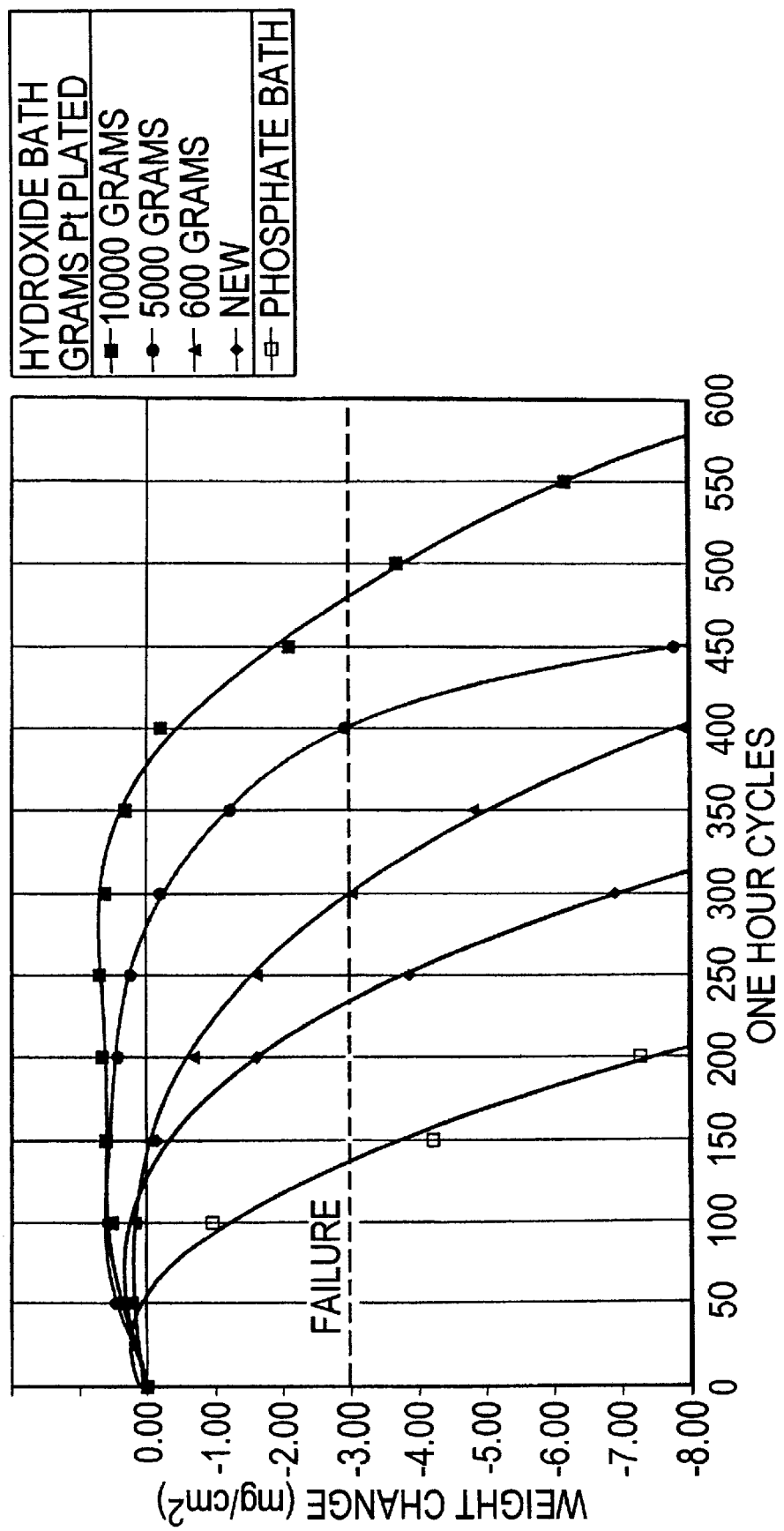
FIG. 7 is a graph depicting comparative cyclic oxidation resistance at 2150 degrees F. of outwardly grown single phase CVD platinum aluminide coatings designated MDC-150L formed on PWA-1480 nickel base superalloy substrates in accordance with an embodiment of the present invention using an aqueous caustic platinum plating solution after different amounts of platinum were plated therefrom such that increased concentrations of K and Na were present in the plating solution. In addition, data on MDC-150L platinum modified aluminide coating made using a conventional phosphate Pt plating bath is included for comparison.

The samples were oxidation tested in the manner described above at 2150 degrees F., and the results are shown in FIG. 7. The cycles to failure (weight loss of 3 milligrams/cm$^2$) and the relative life of the coatings with the samples plated in both the hydroxide plating solution pursuant to the invention and the phosphate plating solution as a baseline (Phosphate Baseline=133/133 for the Phosphate Baseline column and Hydroxide Baseline=230/230) for the Hydroxide Baseline) are given in Table 5.

TABLE 5

| HYDROXIDE BATH DEPLETION | CYCLES TO FAILURE | RELATIVE LIFE PHOSPHATE BASELINE | HYDROXIDE BASELINE |
|---|---|---|---|
| 0 | 230 | 1.73 | 1 |
| 600 | 292 | 2.20 | 1.3 |
| 5,000 | 402 | 3.02 | 1.8 |
| 10,000 | 475 | 3.57 | 2.1 |
| PHOSPHATE BATH | 133 | 1 | 0.58 |

FIG. 7 and Table 5 reveal a siginificant and unexpected improvement in the oxidation resistance of the MDC-150L samples as the depletion of platinum (grams platinum plated from the solution) from the plating solution increases. In particular, a 2.1 times increase is evident in oxidation resistance for the MDC-150L coated samples platinum plated after 10,000 grams of Pt (65 grams K per liter and 10 grams Pt per liter) as compared to the MDC-150L coated samples platinum plated at 0 grams of Pt plated [6.3 grams K per liter (or 9 grams KOH per liter) and 10 grams Pt per liter] corresponding to a new plating solution. The significant and unexpected increase in oxidation resistance is attributed to introduction or doping of potassium, sodium, and calcium in the platinum plating and in the aluminide diffusion coating outwardly grown on the platinum plating. The incorporation of an alkali element such as K and/or Na or an alklaine earth element such as Ca and/or Mg in the platinum plating bath and thus in both the platinum plating and the alumnide diffusion coating, whether formed on the platinum plating by inward or outward diffusion aluminizing processes, provides highly beneficial effects on oxidation resistance of the coating.

Generally, the aqueous caustic plating solution will have greater than about 10 grams K per liter in order to incorporate K into the platinum deposit and the aluminide diffusion coating formed thereon at levels effective to improve oxidation resistance. The aqueous caustic plating solution will have greater than 0.05 grams per liter Na in order to incorporate Na into the platinum deposit and the aluminide diffusion coating formed thereon to this same end.

The oxidation test results presented above indicate that improved oxidation resistance of a platinum modified aluminide diffusion coating can be achieved by reducing the concentration of such tramp impurities as P, S, and Cl, FIGS. 1–3, and also, and more significantly, by introducing or doping the platinum deposit and the aluminide diffusion coating formed thereon with at least one of an alklai element and alklaine earth element present in the platinum deposit, as illustrated in FIGS. 6 and 7.

Although the invention has been shown and described with respect to certain embodiments thereof, it should be understood by those skilled in the art that other various changes, modifications and omissions in the form and detail thereof may be made therein without departing from the spirit and scope of the invention.

We claim:

1. A substrate having a platinum modified aluminide diffusion coating produced by electroplating the substrate with a layer comprising platinum from an aqueous electroplating solution including a hydroxide selected from the group consisting of an alkali hydroxide and alkaline earth hydroxide and aluminizing the electroplated substrate to form the platinum modified aluminide diffusion coating that includes at least one of an alkali element and an alkaline earth element.

2. A substrate having a platinum modified aluminide diffusion coating produced by electroplating the substrate from an aqueous electroplating solution including a hydroxide selected from the group consisting of alkali hydroxide and alkaline earth hydroxide to deposit a layer that comprises platinum and at least one of an alkali element and alkaline earth element present in said electroplating solution and aluminizing the electroplated substrate to form the platinum modified aluminide diffusion coating that includes at least one of the alkali element and alkaline earth element.

3. A coated substrate having an outwardly grown platinum modified aluminide diffusion coating having a concentration of sulfur in an outer layer of the coating that is at least 50% less than the sulfur concentration of the substrate, said coating including an element selected from the group consisting of an alkali element and alkaline earth element to improve oxidation resistance of the coating.

4. The coated substrate of claim 3 wherein said coating comprises a single phase.

5. A coated substrate having an outwardly grown platinum modified aluminide diffusion coating having a concentration of sulfur less than about 10 parts per million by weight in an outer layer of the coating, said coating including an element selected from the group consisting of an alkali element and alkaline earth element to improve oxidation resistance of the coating.

6. The coated substrate of claim 5 wherein said coating comprises a single phase.

7. A coated substrate having a platinum modified aluminide diffusion coating including an element selected from the group consisting of an alkali element and akaline earth element present to improve oxidation resistance of said coating.

8. The coated substrate of claim 7 wherein the alkali element is selected from the group consisting of K and Na.

9. The coated substrate of claim 7 wherein the alkaline earth element is selected from the group consisting of Ca and Mg.

10. A coated superalloy substrate having a platinum modified aluminide diffusion coating including an element selected from the group consisting of an alkali element and alkaline earth element to improve oxidation resistance of said coating.

11. The coated substrate of claim 10 wherein said platinum modified aluminide diffusion coating is an outwardly grown coating.

12. The coated substrate of claim 10 wherein said platinum modified aluminide diffusion coating is an inwardly grown coating.

13. The coated substrate of claim 7 wherein said platinum modified aluminide diffusion coating is an outwardly grown coating.

14. The coated substrate of claim 7 wherein said platinum modified aluminide diffusion coating is an inwardly grown coating.

* * * * *